US012665860B2

(12) United States Patent
Krivenok et al.

(10) Patent No.: US 12,665,860 B2
(45) Date of Patent: Jun. 23, 2026

(54) DATA STORAGE ACCESS WITH MULTI-CORE PROCESSING BASED ON SOURCE PORT IDENTIFIER GROUPINGS

(71) Applicant: Dell Products L.P., Round Rock, TX (US)

(72) Inventors: Dmitry Vladimirovich Krivenok, Dublin (IE); Eldad Zinger, Raanana (IL); Amitai Alkalay, Kadima (IL)

(73) Assignee: Dell Products L.P., Round Rock, TX (US)

( * ) Notice: Subject to any disclaimer, the term of this patent is extended or adjusted under 35 U.S.C. 154(b) by 148 days.

(21) Appl. No.: 18/816,397

(22) Filed: Aug. 27, 2024

(65) Prior Publication Data

US 2026/0067231 A1 Mar. 5, 2026

(51) Int. Cl.
| | |
|---|---|
| *H04L 47/78* | (2022.01) |
| *H04L 47/70* | (2022.01) |
| *H04L 67/1097* | (2022.01) |

(52) U.S. Cl.
CPC .......... *H04L 47/781* (2013.01); *H04L 47/826* (2013.01); *H04L 67/1097* (2013.01)

(58) Field of Classification Search
CPC . H04L 67/1097; H04L 47/781; H04L 47/826; H04L 47/828
See application file for complete search history.

(56) References Cited

U.S. PATENT DOCUMENTS

| | | | |
|---|---|---|---|
| 11,575,607 B2 | 2/2023 | Palermo et al. | |
| 2015/0215819 A1* | 7/2015 | Bosch ................... | H04W 24/02 |
| | | | 370/236 |
| 2017/0093792 A1* | 3/2017 | Marom ................. | H04L 61/255 |
| 2020/0310657 A1 | 10/2020 | Cayton et al. | |
| 2021/0224138 A1* | 7/2021 | Wang ..................... | G06F 9/546 |
| 2021/0320881 A1* | 10/2021 | Coyle ................. | H04L 47/2441 |

OTHER PUBLICATIONS

Taylor, Richard., Modular Arithmetic: Driven by Inherent Beauty and Human Curiosity., Institute for Advanced Study., 2012. https://www.ias.edu/ideas/2012/taylor-modular-arithmetic (Year: 2012).*

* cited by examiner

*Primary Examiner* — Kostas J Katsikis
(74) *Attorney, Agent, or Firm* — BainwoodHuang

(57) ABSTRACT

A method for distributing a number K network connections from a host computer (host) to a smaller number M of core-affined receive queues (RXQs) of a data storage system (DSS) includes, by the host, allocating source network port identifiers (port IDs) from M identifier-defined groups, and using the allocated port IDs for respective network connections to the DSS. The DSS performs receive flow steering of host network traffic among the RXQs based on rules associating the M groups of port IDs with corresponding ones of the RXQs. In an example, port IDs are allocated and assigned to groups based on a modular arithmetic technique, and the DSS uses a modular operation on the port IDs of received network traffic to direct the traffic to respective cores, promoting balanced core utilization as well as alignment of requests to cores via the RXQs, with system performance benefit.

17 Claims, 3 Drawing Sheets

40 —

HOST
ALLOCATE SOURCE PORT IDs FROM M IDENTIFER-DEFINED GROUPS AND USE FOR RESPECTIVE CONNECTIONS TO DSS

42 —

DSS
PERFORM RX FLOW STEERING AMONG CORE-AFFINED QUEUES BASED ON RULES ASSOCIATING M GROUPS OF PORT IDs WITH CORRESPONDING QUEUES

DATA STORAGE ACCESS WITH MULTI-CORE PROCESSING BASED ON SOURCE PORT IDENTIFIER GROUPINGS

BACKGROUND

The invention is directed to the field of distributed computing systems, and in particular to distributed systems in which a set of host computers access data storage provided by a data storage system via a network.

SUMMARY

A method is disclosed for distributing a first number K of network connection from a host computer to a smaller number M of core-affined receive queues of a data storage system. The method includes, by the host computer, allocating source network port identifiers from M identifier-defined groups, and using the allocated source network port identifiers for respective distinct network connections to the data storage system for data transfer therewith. The data storage system performs receive flow steering of received host network traffic among the core-affined receive queues based on a set of rules associating the M identifier-defined groups of source port identifiers with corresponding ones of the core-affined receive queues. In an embodiment, source network port identifiers are allocated and assigned to groups based on a modular arithmetic technique applied to the identifiers, and the data storage system uses a modular operation on the port identifiers of received network traffic to direct the traffic to respective processing cores, promoting balanced core utilization as well as alignment of requests to cores via intervening queues, with associated system performance benefit.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
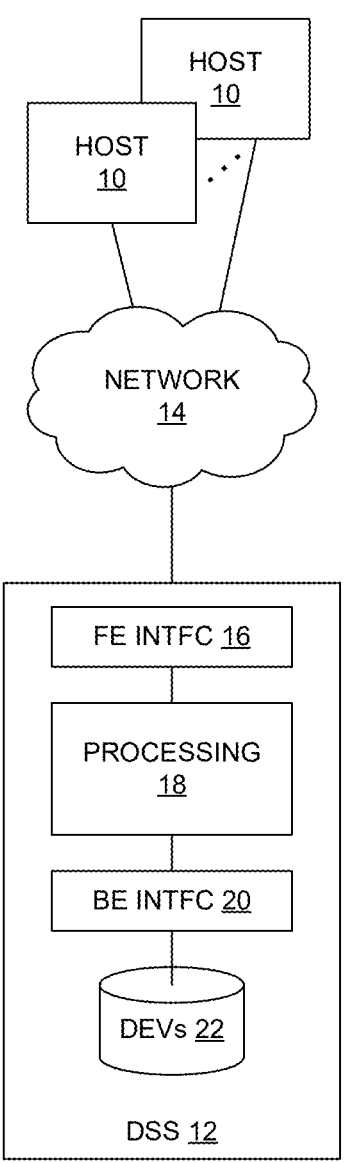
FIG. 1 is a block diagram of a computer system having a set of host computers accessing a data storage system via a network.

Modern high-performance storage protocols such as Non-Volatile Memory Express-Transmission Control Protocol (NVMe-TCP) employ multi-queue design to achieve high performance on multi-core machines with constantly increasing number of CPU cores. One unexpected side effect is the need for a large number of TCP connections and the potential problem of imbalance and misalignment of network and NVMe-TCP protocol processing across CPU cores of the data storage system. This problem occurs in part due to widespread use of a technology called Receive Side Scaling (RSS) in modern network interface cards (NICs) to distribute incoming traffic across receive queues. As described more below, RSS employs a hash-based approach to traffic distribution that does not guarantee adequate balance and alignment.

Accelerated Receive Flow Steering (aRFS) is a network technology which may be used to overcome RSS shortcomings, providing for improved balancing and protocol processing alignment to improve CPU cache utilization in front-end processing of data storage systems. However, being a hardware offload technology, aRFS has limited capabilities in terms of the number of rules it support as well as the flexibility of rule definition, which hinders the use of aRFS for NVMe-TCP protocol at enterprise scale.

In a disclosed approach, a computing system employing NVMe-TCP is made "aRFS friendly" without requiring any protocol changes by use of a particular source TCP port number selection algorithm. This can enable improved performance by using only a small number of aRFS rule slots and relatively simple rules.

The technique is described in an example NVMe-TCP environment, i.e., where NVMe-based storage access is provided over an TCP/IP network. The technique may be applicable to other protocols such as iSCSI as well. In a TCP/IP environment, every queue is implemented as a dedicated TCP connection between the host (initiator) and storage system (target). By default, each host creates multiple NVMe-TCP queues-one queue per host CPU core (or logical processor if hyperthreading is enabled). This enables the host to avoid synchronization overheads between CPU cores and achieve better scalability. Modern hosts may easily have up to 256 (sometimes even more) CPU cores. Storage systems usually provide storage to multiple hosts, which in some environments may reach into the hundreds. Thus, the problem of many per-host TCP connections can be appreciated.

To make things simpler for illustration, consider a data storage system (DSS) which has only one node and only one network port in a network interface card (NIC). When all N hosts each having K CPU cores connect to the DSS via NVMe-TCP, there will be $N*K$ TCP connections between the hosts and the DSS, one per NVMe-TCP queue (assuming K is the same for all hosts for simplicity). One benefit of the disclosed technique is that the DSS can handle the traffic from each host in exactly the same manner, because of the use of port identifiers and independence from network addresses or other host-specific values.

Assuming that the DSS has M CPU cores for network and NVMe-TCP processing, it may generally be desired that the traffic for the $N*K$ queues is divided evenly across the M cores. The processing of NVMe-TCP packets may be split into four main stages:

1. NIC identifies which receive queue (RXQ) to send packet to
2. CPU core associated with RXQ is interrupted and interrupt is handled
3. Softirq processing is done (usually on the same core which handled interrupt)
4. NVMe-TCP target reads data from the socket and processes the protocol For a given TCP connection T, an ideal case would be for the NIC to direct traffic to the RXQ that interrupts the same CPU core which owns the corresponding NVMe-TCP queue. In this case, all processing is fully aligned with the core, and because the DSS assures even distribution of N*K queues across M cores, all cores are evenly utilized under load.

Stages 2-4 above are configuration matters within the control of a given DSS. However, at stage 1 the NIC must direct the traffic to the correct RXQ. This is exactly where the problem is when RSS is used. RSS works by calculating a hash (usually Toeplitz hash) over the headers of incoming packets. The hash is used as an index in an indirection table to find which RXQ to pick for a particular flow. Any TCP connection T always stays affined to a particular RXQ and does not move between RXQs. However, the hash-based approach of RSS cannot guarantee balance across RXQs. Some RXQs handle more TCP connections, some will handle less. It depends only on source and destination IPs and port numbers, i.e., random data. There is no way to achieve perfect balancing with RSS. This will cause imbalances in utilization of CPU cores and will hurt performance.

A second problem is that RSS can also cause misalignment in processing. Consider an example in which TCP connection TO has associated NVMe-TCP Q0 owned by CPU core C0. RSS calculates a hash over TO headers and directs traffic to NIC RXQ1, which interrupts core C1. IRQ and softirq processing happens on core C1, but then the thread handling NVMe-TCP queue Q0 will read data from a corresponding socket while running on CPU core C0. This impacts CPU cache efficiency because the processing of T0 is distributed between cores C1 and C0 and is not aligned with a single core.

Generally, RSS is incapable of achieving ideal balancing across RXQs, and even in an unlikely case having TCP flows balanced across RXQs, RSS cannot guarantee alignment of end-to-end processing for a given TCP connection to a single CPU core. Thus, the hash-based technique of RSS does not address performance needs for data storage systems handling storage needs for a large number of hosts.

Embodiments

FIG. 1 is a simplified block diagram of a computer system having host computers (hosts) 10 coupled to a data storage system (DSS) 12 via a network 14. The DSS 12 is a specialized hardware platform generally including front-end interface circuitry (FE INTFC) 16, storage processing circuitry 18, back-end interface circuitry (BE INTFC) 20 and storage devices (DEVs) 22 as shown. The front-end interface circuitry 16 interfaces the DSS 12 to the network 14 and remote hosts 10, while the back-end interface circuitry 20 interfaces the storage processing circuitry 18 to the storage devices 22. In operation, the hosts 10 generate storage commands (e.g., data writes, reads) that result in storing host data on the storage devices 22 (for writes) and returning stored data to the hosts 10 (reads), as generally known. The storage processing circuitry 18 is typically a multi-processing complex having multiple processing units, each typically having multiple processing "cores", all executing specialized data storage software that uses the underlying hardware resources to realize the overall functionality of the DSS 12, also as generally known.

Figure 2:
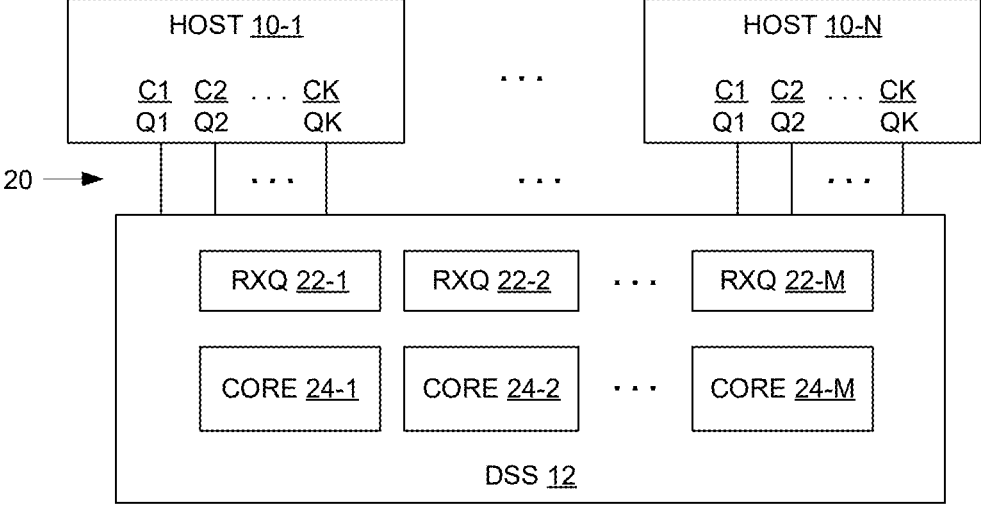
FIG. 2 is a schematic diagram of certain details of the host computers and data storage systems in relation to network connections used for storage access by the hosts.

FIG. 2 is a schematic depiction of certain logical organization used in the computing system of FIG. 1. There are assumed to be a number N of hosts 10, identified as 10-1, 10-2, . . . , 10-N, each having up to another number K of processing cores C and associated storage command queues Q, which are enumerated from 1 to K as shown. Thus core C1 contains queue Q1, core C2 contains queue Q2, etc. Each core/queue pair has an associated connection 20 to the DSS, via which the core transmits data storage commands and receives corresponding responses. The DSS 12 is shown as having a set of M receive queues (RXQs) 22 (enumerated 22-1 through 22-M) and a number M of processing cores 24 (enumerated 24-1 through 24-M).

It will be appreciated that the DSS 12 manages commands of a large number of connections 20, e.g., as high as N*K in this example, using a generally smaller number M of RX queues 22 and cores 24. The front-end interface circuitry 16 (which contains the RX queues 22) is responsible for distributing the traffic of these connections among the RX queues 22 and cores 24 in an efficient and performant manner. A technique is described below with reference to a single host 10, and it will be understood that in a multi-host system such as that of FIGS. 1 and 2 it is generally desirable that all hosts perform the host-based functions of the technique, and the DSS 10 performs the DSS-based functions for all connected hosts 10, although of course there may be issues of configuration, compatibility, etc. that in any real system might limit use to only a subset of the connected hosts 10, for example.

Figure 4:
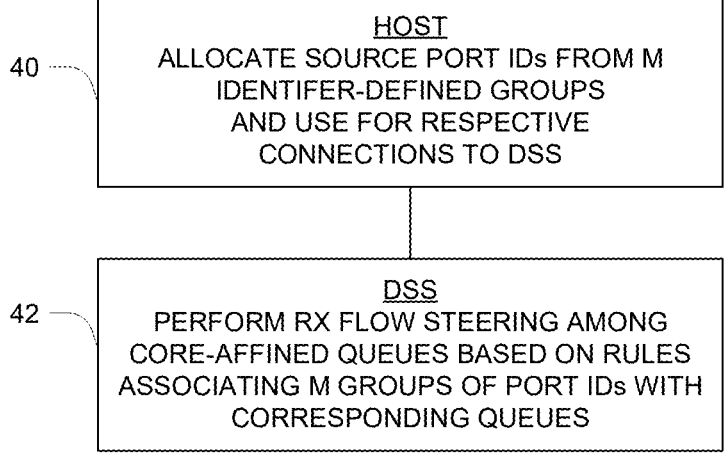
FIG. 4 is a high-level flow diagram of a process for selecting source port identifiers to provide balanced and aligned use of processing cores in the data storage system.
Figure 3:
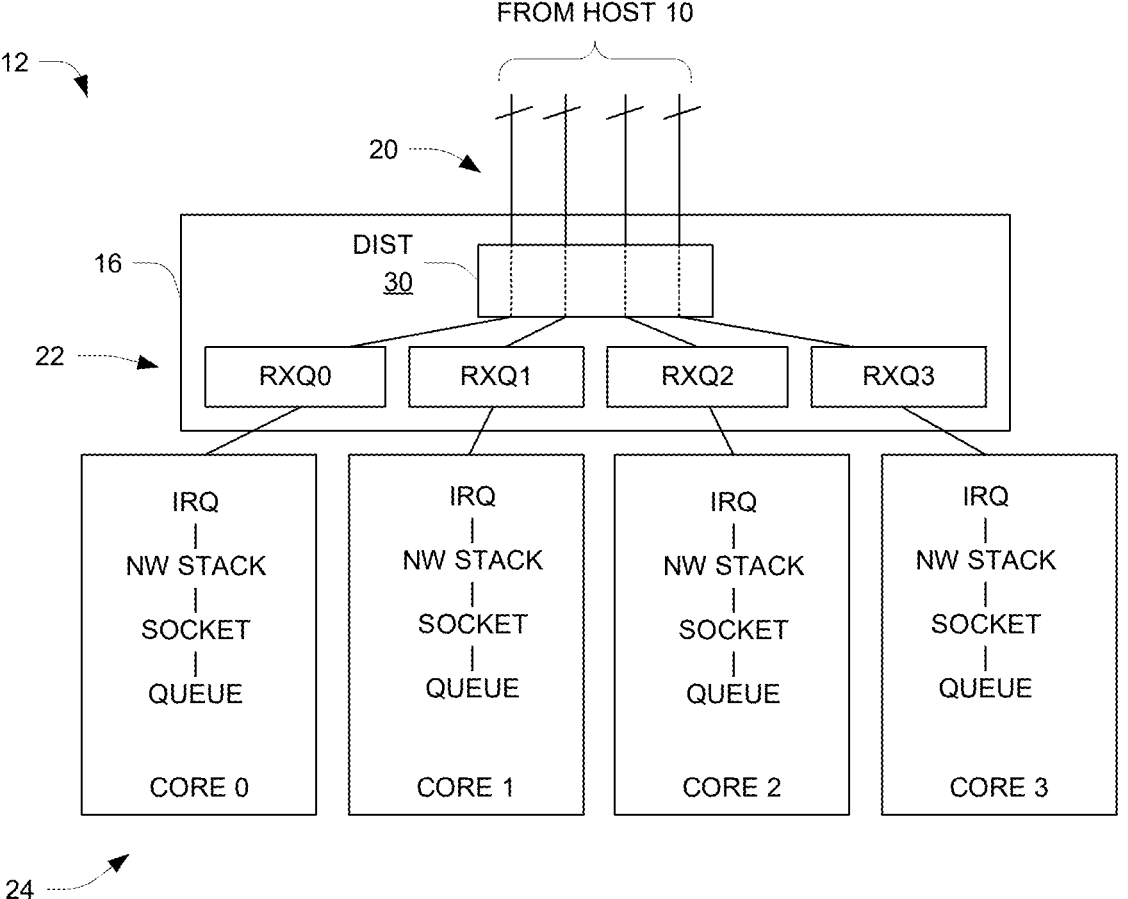
FIG. 3 is a schematic diagram showing details of the data storage system relating to distribution of traffic receive queues and processing cores.

FIG. 3 shows details of an illustrative example in which the DSS 12 has four cores 24 and the front-end interface circuitry 16 has four RX queues 22. In this example and the remaining description, items are given numeric identifiers in ranges beginning with 0, i.e., 0, 1, . . . , a scheme generally used in the computer arts. Thus the four RX queues 22 are identified as RXQ0 through RXQ3, and the cores 24 are identified as Core 0 through Core 3, etc. Each core 22 is shown as including an interrupt queue (IRQ), network stack (NW STACK), and a socket and queue which are typically included in a respective distinct processing thread executed by the core. The front-end interface circuitry 16 includes a distributor (DIST) 30 responsible for distributing traffic of the host connections 20 among the RX queues 22 and thus the respective cores 24. The RX queues 22 are "core-affined", meaning that each RX queue 22 is used for directing traffic to only the corresponding core 24. Regarding the connections 20, in FIG. 3 each individual line (of four that are shown) represents a group of multiple connections from the host 10, as is described below. As noted above, for an individual host 10 there might be as many as K connections, with K typically much larger than 4. In such a case, each individual line in FIG. 4 represents a set of K/4 connections 20.

In one embodiment, the distributor 30 can be realized using a hardware acceleration function called "accelerated receive flow steering" (aRFS) which is supported by modern network interface cards (NICs). aRFS is able to perform a basic match on network packet headers and perform a limited set of actions. Actions might be dropping a packet or directing it to a specific RXQ. For example, in aRFS it is possible to deploy the following rules for traffic forwarding, where the connection numbers are Address:Port ID pairs (source→destination) as generally known:

TCP connection 10.0.0.10:42300→10.0.0.100:4420—direct to RXQ 0

TCP connection 10.0.0.10:42308→10.0.0.100:4420—direct to RXQ 1

TCP connection 10.0.0.10:42322→10.0.0.100:4420—direct to RXQ 2

TCP connection 10.0.0.10:42398→10.0.0.100:4420—direct to RXQ 3

Such functionality can be used in conjunction with the following system/DSS configuration information to realize traffic distribution as described herein:

Which RXQ interrupts which CPU core

Which NVMe-TCP Qs (host-side) are associated with which CPU core (owner core)

5-tuple for TCP connection associated with any NVMe-TCP Q

One challenge, however, is that there may be only a small number of aRFS "slots" for the required rules. It may not be possible to use a one-rule-per-connection scheme (e.g., in NVMe-TCP use-case) because N*K is much larger than number of aRFS slots available in the NIC that implements the front-end circuitry 16. Another challenge is that an aRFS rules engine cannot be programmed to do complex analysis of network packets, which means that the rules must be based on common network fields of Ethernet, IP and TCP/UDP headers, and employ simple operations such as simple value comparison and applying a mask. Finally, another issue with rule-based traffic directing is that individual NVMe-TCP protocol data units (PDUs) lack any individual identifier, and they might not be fully accessible in any event due to things like encryption or the segmenting of PDUs across multiple TCP/IP packets (so that not all packets necessarily include a PDU header to inspect).

Thus to realize a desired pattern of connection traffic among the cores 24, a technique is used with a specified manner of TCP source port selection for NVMe-TCP connections being used on the host side, and related functionality on the DSS side. This can be provided as an optional performance optimization feature in some embodiments. It requires only that the host 10 know the number M of CPU cores on the target DSS 12. The DSS may make knowledge of M available via an application programming interface (API) and/or a user interface (UI). The value M may be manually configured on the host 10 by an administrator or it might be automatically obtained by the NVMe-TCP initiator (host 10) in the OS by extending the discovery part of NVMe-TCP protocol. It will be appreciated that the manner by which a host 10 knows M is generally not essential, so for the remaining description it is just assumed that each host 10 knows M for the target DSS 12. If a given host 10 connects to multiple target DSSs 12, then the host 10 needs to know M for each of them (as they may in general be different among a set of DSSs 12).

More particularly, an NVMe-TCP initiator (e.g., host 10) allocates source TCP ports not randomly, but in a deterministic manner that enables groups of connections 20 to be consistently associated with respective cores 24 of the DSS 12, without explicit signaling or other mechanisms that might require special features of the network protocol(s) used for the connections 20. The groups are defined by the values source port identifiers (IDs) in a known relationship to M, which makes it straightforward for a host 10 to allocate the IDs and for a DSS 10 to assign the connections 20 to the cores 24.

FIG. 4 illustrates the technique at a high level. Overall, the technique is for distributing a first number K of network connections from a host computer (e.g., host 10) to a smaller number M of core-affined receive queues of a data storage system (e.g., DSS 12).

At 40, the host computer allocates source network port identifiers from M identifier-defined groups, and uses the allocated source network port identifiers for respective distinct network connections to the data storage system for data transfer therewith. "Identifier-defined" refers to the fact that group membership can be discerned by inspection of an allocated source port ID, in relation to M which is of course known by the DSS 12. In one embodiment, port ID assignment is based on a modular arithmetic technique, as described with reference to an illustrative example below.

At 42, the data storage system performs receive flow steering of received host network traffic among the core-affined receive queues (e.g., RXQs 22) based on a set of rules associating the M identifier-defined groups of source port identifiers with corresponding ones of the core-affined receive queues. The rules of course reflect the manner of assignment by the host. Illustrative DSS processing is described below.

As noted, in one embodiment a technique is used that is based on modular arithmetic applied to the source port identifiers. A host 10 uses the value M for the target DSS 12 and derives a value M' by rounding M to the nearest power of 2 (e.g., if M=6, then M'=8). The values M and M' establish a least-common multiple lcm(M, M') that serves as a modulus, and port IDs are selected with grouping by remainder value, i.e.:

$$\text{Group 1: } PortID = 0 \ (\text{mod } 1 \text{ cm})$$

$$\text{Group 2: Port } ID = 1 \ (\text{mod } 1 \text{ cm})$$

$$\cdots$$

$$\text{Group } M\text{: Port } ID = M - 1 \ (\text{mod } 1 \text{ cm})$$

In operation, the host 10 allocates up to K NVMe-TCP queues and selects up to K TCP source ports to bind to. The host 10 distributes the port IDs among the groups in an even manner, e.g., a round-robin manner. This can be done by simply incrementing through M port IDs for each of K/M blocks of IDs, as in the example below, which distributes the IDs of each block among the M groups.

Table 1 below illustrates the technique for an illustrative example having K=24 and M=6. In this case, M'=8 and lcm(M, M')=24. The value div (LCM) is the non-remainder part of the modular division, i.e., div (LCM) is the non-remainder part of Source Port ID/lcm(M, M'):

TABLE 1

| TCP Queue # | Source Port ID | div (LCM) | Remainder |
|---|---|---|---|
| 0 | 55296 | 2304 | 0 |
| 1 | 55297 | 2304 | 1 |
| 2 | 55298 | 2304 | 2 |
| 3 | 55299 | 2304 | 3 |
| 4 | 55300 | 2304 | 4 |
| 5 | 55301 | 2304 | 5 |
| 6 | 55320 | 2305 | 0 |
| 7 | 55321 | 2305 | 1 |
| 8 | 55322 | 2305 | 2 |
| 9 | 55323 | 2305 | 3 |
| 10 | 55324 | 2305 | 4 |
| 11 | 55325 | 2305 | 5 |
| 12 | 55440 | 2310 | 0 |
| 13 | 55441 | 2310 | 1 |
| 14 | 55442 | 2310 | 2 |
| 15 | 55443 | 2310 | 3 |
| 16 | 55684* | 2320* | 4 |
| 17 | 55445 | 2310 | 5 |
| 18 | 55464 | 2311 | 0 |
| 19 | 55465 | 2311 | 1 |
| 20 | 55466 | 2311 | 2 |
| 21 | 55467 | 2311 | 3 |
| 22 | 55468 | 2311 | 4 |
| 23 | 55469 | 2311 | 5 |

In Table 1, the remainder values are staggered to highlight their role in defining the M groups. Thus, NVMe-TCP queues 0, 6, 12 and 18 belong to the same group because they have the same remainder value 0 mod M (as well as 0 mod M', because port IDs are selected within lcm(M, M') blocks). As noted above, assuming availability, source port IDs can be assigned by incrementing within each of the K/M-size blocks, which in this example have div (LCM) values of 2304, 2305, 2310 and 2311 respectively. However, it should be noted that this is simply a convenience and not required, as reflected in the off-pattern assignment for queue 16 (indicated by *). This may occur when a conflict is encountered, for example, so the selection process has to pick a same-remainder value from another block. Conflicts may be unlikely in practice, because ports are selected in a context of source host IP, destination target IP and destination target port (4420) with the NVMe-TCP initiator fully in control because it establishes all TCP connections. However, if some other entity on the host 10 has previously bound to a given port making it unavailable, the NVMe-TCP initiator can select from another block (e.g., next sequential block) and pick the next available port satisfying the same-remainder requirement. In the example above for queue #16, the port ID 55444 is already used, so the initiator selects port ID 55684 from the block 2320.

With the source port IDs being selected and grouped in the ID-defined manner such as described above, the DSS 12 can utilize a simple set of rules, as well as certain configuration, to consistently direct the traffic of the connections 20 to corresponding cores 24. The DSS 12 also calculates M' for itself, and uses this value to establish traffic forwarding rules in the front-end interface circuitry 16, e.g.:

Rule #1: src_port & $(M'-1)$ ==

0 and dst_port == 4420: direct to *RXQ* 0

Rule #2: src_port & $(M'-1)$ == 1 and dst_port == 4420: direct to *RXQ* 1

Rule #3: src_port & $(M'-1)$ == 2 and dst_port == 4420: direct to *RXQ* 2

...

Rule #M: src_port & $(M'-1)$ == M -

1 and dst_port == 4420: direct to *RXQ* M - 1

In the above, the value M'−1 is used as a mask on the Source Port ID, so that the application of the mask yields the remainder value that identifies the group for the connection. Referring to the above example, M'−1=7 which is 111 binary, i.e., the masking operation results in looking at the three LSBs of the source port ID, and each unique three-LSB value (0 through 5 in this example) identifies the respective group and thus the respective RXQ to which the traffic for the group is to be forwarded.

From a configuration perspective, the DSS 12 needs to associate each NVMe-TCP Q with a respective CPU core 24 interrupted by a respective RXQ 22, according to the index values src_port & (M'−1).

It should be noted that the above rules do not depend on specific source and destination IP addresses, which means that they can be applied to all incoming traffic from any number of hosts 10. Only M rules are needed, which is both simple and efficient.

In the above example, the number of per-host connections K happens to be a multiple of M', but this is not the case in general. For a non-multiple case, the host 10 may not start at index 0 for the connections to such a DSS 12 (as in above example), but instead pick according to some other criteria, e.g., starting at an index randomly selected within a range of [0, M).

One feature of the disclosed technique used with aRFS in particular is that only a small number M of aRFS rules are required, so the technique can be supported by any NIC that supports at least M aRFS slots. Also, no complex math is required, as the essential operation is simply application of a short mask value to the source port number.

Below are some additional benefits that may be realized in embodiments:

The approach works with existing NIC hardware and does not require increased aRFS storage or more sophisticated matching capabilities The approach requires only M aRFS rules to handle a much larger number N*K TCP connections, where M is typically smaller than the number of available aRFS slots The approach does not require any modifications in NVMe-TCP protocol and is fully compatible with encryption because it does not rely on examining data within NVMe-TCP PDUs The approach enables a DSS to both balance across NIC RXQs and CPU cores as well as strict alignment of NVMe-TCP queue processing to a single core, improving performance.

The approach is based on industry standard technology generally supported by most/all vendors.

Assuming that M is realized as a DSS-specific variable (rather than somehow fixed and immutable), the approach allows for changing the value of M (for example, when software upgrade is installed) which provides flexibility to storage system designers with respect to CPU cores allocation.

While various embodiments of the invention have been particularly shown and described, it will be understood by those skilled in the art that various changes in form and details may be made therein without departing from the scope of the invention as defined by the appended claims.

What is claimed is:

1. A method of distributing a first number K of network connections from a host computer to a smaller number M of core-affined receive queues of a data storage system, comprising:

by the host computer, allocating source network port identifiers from M identifier-defined groups, and using the allocated source network port identifiers for respective distinct network connections to the data storage system for data transfer therewith; and by the data storage system, performing receive flow steering of received host network traffic among the core-affined receive queues based on a set of rules associating the M identifier-defined groups of source port identifiers with corresponding ones of the core-affined receive queues, wherein allocating source network port identifiers uses a modular arithmetic scheme based on M, defining the groups as source network port identifiers having a corresponding same remainder value.

2. The method of claim 1, wherein M is dynamically configured or learned by the host computer prior to the allocating and using steps.

3. The method of claim 1, wherein the modular arithmetic scheme includes use of a rounded value M' being a next power of two greater than M, and a least common multiple lcm(M, M') serving as the modulus in the modular arithmetic scheme.

4. The method of claim 3, wherein the groups of source network port identifiers are distributed across a set of K/M blocks of generally sequential source network port identifiers, subject to availability for use at a time of allocation.

5. The method of claim 4, wherein, for one or more of the K/M blocks, one or more of the source network port identifiers is taken from another block due to lack of availability of the corresponding source network port identifier of the K/M blocks.

6. The method of claim 1, wherein the rules utilize a mask value applied to source network port identifiers of received network traffic, and the traffic is directed to the core-affined receive queues based on group-identifying values obtained from the application of the mask value.

7. The method of claim 6, wherein the mask value is a value (M'−1), M' being a next power-of-two greater than M.

8. The method of claim 1, wherein the receive flow steering is performed by a hardware accelerator component of a front-end network interface of the data storage system.

9. The method of claim 1 performed in a multi-host environment, wherein each host computer performs the allocating and using steps for respective connections to the data storage system, and the data storage system performs the same receive flow steering for host network traffic of all the host computers to distribute the traffic among the core-affined receive queues.

10. A host computer having a plurality of processing cores and corresponding storage-access queues to access a data storage system using a first number K of network connections to a smaller number M of core-affined receive queues of the data storage system, the host computer being configured and operative, in connection with establishing the network connections, to (1) allocate source network port identifiers from M identifier-defined groups, and (2) use the allocated source network port identifiers for respective distinct network connections to the data storage system for data transfer therewith, wherein allocating source network port identifiers uses a modular arithmetic scheme based on M, defining the groups as source network port identifiers having a corresponding same remainder value.

11. The host computer of claim 10, wherein the modular arithmetic scheme includes use of a rounded value M' being a next power of two greater than M, and a least common multiple lcm(M, M') serving as the modulus in the modular arithmetic scheme.

12. The host computer of claim 11, wherein the groups of source network port identifiers are distributed across a set of K/M blocks of generally sequential source network port identifiers, subject to availability for use at a time of allocation.

13. The host of claim 12, wherein, for one or more of the K/M blocks, one or more of the source network port identifiers is taken from another block due to lack of availability of the corresponding source network port identifier of the K/M blocks.

14. A data storage system having a number M of processing cores and respective core-affined receive queues for handling host storage requests received on a larger number K of network connections to a host computer, the data storage system being configured and operative to steer received host network traffic among the core-affined receive queues based on a set of rules associating M identifier-defined groups of source port identifiers with corresponding ones of the core-affined receive queues, wherein the source network port identifiers are allocated using a modular arithmetic scheme based on M, defining the groups as source network port identifiers having a corresponding same remainder value.

15. The data storage system of claim 14, wherein the modular arithmetic scheme includes use of a rounded value M' being a next power of two greater than M, and a least common multiple lcm(M, M') serving as the modulus in the modular arithmetic scheme.

16. The data storage system of claim 14, wherein the rules utilize a mask value applied to source network port identifiers of received network traffic, and the traffic is directed to the core-affined receive queues based on group-identifying values obtained from the application of the mask value.

17. The data storage system of claim 16, wherein the mask value is a value (M'−1), M' being a next power-of-two greater than M.

\* \* \* \* \*